US012614174B2

(12) United States Patent
Kang et al.

(10) Patent No.: US 12,614,174 B2
(45) Date of Patent: Apr. 28, 2026

(54) ELECTRONIC DEVICE USING BLOCKCHAIN AND CONTROL METHOD THEREOF

(71) Applicant: LG ELECTRONICS INC., Seoul (KR)

(72) Inventors: Moojin Kang, Seoul (KR); Sukyoung Kim, Seoul (KR); Seungbum Hong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 25 days.

(21) Appl. No.: 18/654,644

(22) Filed: May 3, 2024

(65) Prior Publication Data

US 2025/0078070 A1     Mar. 6, 2025

(30) Foreign Application Priority Data

Aug. 30, 2023    (KR) ........................ 10-2023-0114325

(51) Int. Cl.
*G06Q 20/38*        (2012.01)
*G06F 21/64*        (2013.01)
(Continued)

(52) U.S. Cl.
CPC ........... *G06Q 20/389* (2013.01); *G06F 21/64* (2013.01); *G06Q 20/065* (2013.01); *G06Q 20/12* (2013.01);
(Continued)

(58) Field of Classification Search
CPC ............. G06Q 20/389; G06Q 20/3825; G06Q 20/405; G06Q 20/308; G06Q 20/065;
(Continued)

(56) References Cited

U.S. PATENT DOCUMENTS

| | | | |
|---|---|---|---|
| 10,915,891 B1 * | 2/2021 | Winklevoss | ........... G06Q 20/36 |
| 2019/0018888 A1 * | 1/2019 | Madisetti | ................ G06F 16/27 |

(Continued)

OTHER PUBLICATIONS

Al Sadawi et al. "On the Integration of Blockchain with IoT and the Role of Oracle in the Combined System: The Full Picture", IEEE Access, Sep. 9, 2022, pp. 92532-92558 (Year: 2022).*
(Continued)

*Primary Examiner* — James D Nigh
(74) *Attorney, Agent, or Firm* — Birch, Stewart, Kolasch & Birch, LLP

(57)                ABSTRACT

A method for controlling an electronic device using blockchain can include transmitting, by a processor in the electronic device, a first transaction to a device account (DA) stored in a distributed server of a blockchain network and logically coupled with the electronic device, the DA including data uniquely identifying the electronic device, transmitting, by the DA, a second transaction to a smart contract, and transmitting, by the DA, device data for controlling an operation of the electronic device to the smart contract. Also, the method can further include receiving, by the DA, data corresponding to a first value according to a transaction rule defined in the smart contract, transmitting, by the DA, the first value to the electronic device, and executing, by the electronic device, a control command corresponding to the first value.

19 Claims, 11 Drawing Sheets

(51) Int. Cl.

| | |
|---|---|
| *G06Q 20/06* | (2012.01) |
| *G06Q 20/12* | (2012.01) |
| *G06Q 20/30* | (2012.01) |
| *G06Q 20/36* | (2012.01) |
| *G06Q 20/40* | (2012.01) |
| *G06Q 30/00* | (2023.01) |
| *G06Q 30/0207* | (2023.01) |
| *G06Q 30/0217* | (2023.01) |
| *G06Q 30/0241* | (2023.01) |
| *G07F 9/00* | (2006.01) |
| *H04L 9/00* | (2022.01) |
| *H04L 9/08* | (2006.01) |
| *H04L 9/32* | (2006.01) |
| *H04L 67/303* | (2022.01) |

(52) U.S. Cl.

CPC ........... *G06Q 20/123* (2013.01); *G06Q 20/36* (2013.01); *G06Q 20/3825* (2013.01); *G06Q 20/3829* (2013.01); *G06Q 20/405* (2013.01); *G06Q 30/00* (2013.01); *G06Q 30/0207* (2013.01); *G06Q 30/0217* (2013.01); *G06Q 30/0241* (2013.01); *G07F 9/001* (2020.05); *H04L 9/0822* (2013.01); *H04L 9/3247* (2013.01); *H04L 9/50* (2022.05); *H04L 67/303* (2013.01); *G06Q 20/308* (2020.05); *G06Q 2220/00* (2013.01); *H04L 2209/34* (2013.01)

(58) Field of Classification Search

CPC ...... G06Q 20/12; G06Q 20/123; G06Q 20/36; G06Q 20/3829; G06Q 2220/00; G06Q 30/0207; G06Q 30/0217; G06Q 30/0241; G06Q 30/00; G07F 9/001; H04L 9/50; H04L 9/0822; H04L 9/3247; H04L 67/303; H04L 2209/34; G06F 21/64

USPC .......................................................... 705/75

See application file for complete search history.

(56) References Cited

U.S. PATENT DOCUMENTS

| | | | | |
|---|---|---|---|---|
| 2019/0036887 A1* | 1/2019 | Miller | ....................... | G07C 9/20 |
| 2019/0220836 A1* | 7/2019 | Caldwell | ................... | H04L 9/50 |
| 2019/0333059 A1* | 10/2019 | Fallah | ................. | G06F 16/1834 |
| 2021/0133729 A1* | 5/2021 | Murao | ............... | G06Q 20/3674 |

OTHER PUBLICATIONS

Han et al. "A Blockchain-Based and SGX-Enable Access Control Framework for IoT", Electronics 2022, MDPI, 22 pages (Year: 2022).*

Qashlan et al. "Security and Privacy Implementation in Smart Home: Attributes Based Access Control and Smart Contracts", 2020 IEEE 19th International Conference on Trust, Security and Privacy in Computing and Communications, Mar. 25, 2021, pp. 951-958 (Year: 2021).*

Park et al. "Secure device control scheme with blockchain in a smart home", Measurement and Control 2023, Mar. 20, 2023, vol. 56, pp. 546-557 (Year: 2023).*

* cited by examiner

ELECTRONIC DEVICE USING BLOCKCHAIN AND CONTROL METHOD THEREOF

CROSS REFERENCE TO RELATED APPLICATIONS

This application claims priority to Korean Patent Application No. 10-2023-0114325, filed in the Republic of Korea on Aug. 30, 2023, the entirety of which is hereby incorporated by reference into the present application as when fully set forth herein.

BACKGROUND

Field

The present disclosure relates to an electronic device that uses a blockchain, and a control method thereof. More specifically, the present disclosure relates to all types of electronic devices in which the electronic device becomes a subject of a blockchain account and thus performs smart contract execution and device management more conveniently.

Discussion of the Related Art

The blockchain refers to a data tampering prevention technology based on distributed computing technology in which management target data are stored in a chain-type link-based distributed data storage environment in which small-scale data called 'blocks' are created in the P2P manner, and thus, the management target data cannot be modified arbitrarily and anyone can view the results of change thereof. The blockchain includes a change list in which continuously changed data are recorded in all participating nodes, and thus is designed to be protected from arbitrary manipulation by operators of distributed nodes.

A smart contract is a set of executable software instructions stored and executed in and by a blockchain network. Smart contracts are usually stored in an unencrypted manner and thus transparent to all participants in the blockchain network. Participants in the blockchain network can create and publish their own smart contracts, and can generally call smart contracts already distributed in the blockchain network. Because the set of instructions that can be used in the smart contracts is generally Turing complete, the smart contracts can support a complex logic to support different business scenarios.

Currently, in the blockchain, an account is a basic unit of all transactions. For Ethereum blockchain accounts, account formats called EoA (Externally Owned Accounts) or CA (Contract Accounts) are already solidly designed.

However, when trying to use the device as a subject of the transaction, it is difficult to properly apply characteristics of the device to the account when using only the current EoA and CA accounts.

SUMMARY OF THE DISCLOSURE

One embodiment of the present disclosure seeks to solve the above-mentioned problem and is to propose a device account (DA) that allows a device to operate as the subject of the smart contract on the blockchain.

Another embodiment of the present disclosure is to provide a device that can create a transaction on its own, and can delegate an authority to the owner of the device, and can create a transaction according to the owner's command.

Purposes according to the present disclosure are not limited to the above-mentioned purpose. Other purposes and advantages according to the present disclosure that are not mentioned can be understood based on following descriptions, and can be more clearly understood based on embodiments according to the present disclosure. Further, it will be easily understood that the purposes and advantages according to the present disclosure can be realized using means shown in the claims or combinations thereof.

A first aspect of the present disclosure provides a method for controlling an electronic device using blockchain, the method including transmitting a first transaction to a memory storing therein a device account (DA), in which the DA means data uniquely identifying the electronic device; transmitting a second transaction to the blockchain, based on the DA, in which the smart contract is established based on the second transaction; transmitting at least one device data related to an action of the electronic device to the blockchain; receiving data corresponding to a first value according to a transaction rule defined in the smart contract; transmitting data corresponding to a second value to the blockchain; and playing contents corresponding to the second value, according to the transaction rule defined in the smart contract.

In one implementation of the first aspect, the DA is implemented in a form of software in the blockchain logically coupled to the electronic device.

In one implementation of the first aspect, the first transaction can mean a raw transaction, and the second transaction can mean a transaction.

In one implementation of the first aspect, each of the data corresponding to the second value and the data corresponding to the second value includes sat least one of a token or a coin.

In one implementation of the first aspect, the memory storing therein the DA is positioned at the electronic device or an external blockchain.

In one implementation of the first aspect, the data corresponding to the first value defined in the smart contract or the contents corresponding to the second value defined in the smart contract varies depending on a screen size, or a resolution of the electronic device corresponding to the DA.

In one implementation of the first aspect, the data corresponding to the first value defined in the smart contract or the contents corresponding to the second value defined in the smart contract varies depending on a type of the electronic device corresponding to the DA.

In one implementation of the first aspect, the type of the electronic device corresponding to the DA includes a shared device or a personalized device.

In one implementation of the first aspect, the second transaction is obtained by encoding a signature of the DA into the first transaction.

In one implementation of the first aspect, the method further includes receiving a private key of a first user, in which the first transaction is created based on the private key of the first user.

In one implementation of the first aspect, the electronic device creates the first transaction by itself.

In one implementation of the first aspect, a range of types of the first transaction which can be created is limited.

A second aspect of the present disclosure provides an electronic device using blockchain, the device including a memory storing therein a device account (DA), in which the DA means data uniquely identifying the electronic device; a transceiver configured to transmit and receive data; and a processor connected to the memory and the transceiver, and configured to control the memory and the transceiver, in which the memory receives a first transaction from the processor, in which the transceiver transmits a second transaction to the blockchain based on the DA stored in the memory, in which a smart contract is established based on the second transaction, in which the transceiver transmits at least one device data related to an action of the electronic device to the blockchain, and receives data corresponding to a first value according to a transaction rule defined in the smart contract.

In one implementation of the second aspect, the device further includes a display, in which the transceiver transmits data corresponding to a second value to the blockchain, and the display is configured to play contents corresponding to the second value according to the transaction rule defined in the smart contract.

In one implementation of the second aspect, the DA is implemented in a form of software in the blockchain logically coupled to the electronic device.

In one implementation of the second aspect, the first transaction can mean a raw transaction, and the second transaction can mean a transaction.

In one implementation of the second aspect, each of the data corresponding to the second value and the data corresponding to the second value includes sat least one of a token or a coin.

In one implementation of the second aspect, the memory storing therein the DA is positioned at the electronic device or an external blockchain.

In one implementation of the second aspect, the data corresponding to the first value defined in the smart contract or the contents corresponding to the second value defined in the smart contract varies depending on a screen size, or a resolution of the electronic device corresponding to the DA.

In one implementation of the second aspect, the data corresponding to the first value defined in the smart contract or the contents corresponding to the second value defined in the smart contract varies depending on a type of the electronic device corresponding to the DA.

In one implementation of the second aspect, the type of the electronic device corresponding to the DA includes a shared device or a personalized device.

In one implementation of the second aspect, the second transaction is obtained by encoding a signature of the DA into the first transaction.

In one implementation of the second aspect, the transceiver receives a private key of a first user, in which the first transaction is created based on the private key of the first user.

In one implementation of the second aspect, the electronic device creates the first transaction by itself.

In one implementation of the second aspect, a range of types of the first transaction which can be created is limited.

According to one embodiment of the present disclosure, the device is able to create the transaction on its own and thus can execute arbitrary contracts and transactions without being limited to the existing implemented logic.

According to another embodiment of the present disclosure, convenience can be increased because the device can directly perform the authentication and make the smart contract on the blockchain without going through a broker for authentication.

Further, according to still another embodiment of the present disclosure, the device can act as the subject of the transaction and thus can transfer and receive the asset.

Additional scope of applicability of the present disclosure will become apparent from the detailed description below.

However, since various changes and modifications within the scope of the present disclosure can be clearly understood by those skilled in the art, the detailed descriptions, and specific embodiments such as preferred embodiments of the present disclosure should be understood as being set forth only by way of example.

BRIEF DESCRIPTION OF THE DRAWINGS

The above and other objects, features, and advantages of the present disclosure will become more apparent to those of ordinary skill in the art by describing example embodiments thereof in detail with reference to the attached drawings, which are briefly described below.

FIG. 5 is a diagram for illustrating a service using a device account (DA) according to an embodiment of the present disclosure.

DETAILED DESCRIPTION OF THE EMBODIMENTS

Figure 1:
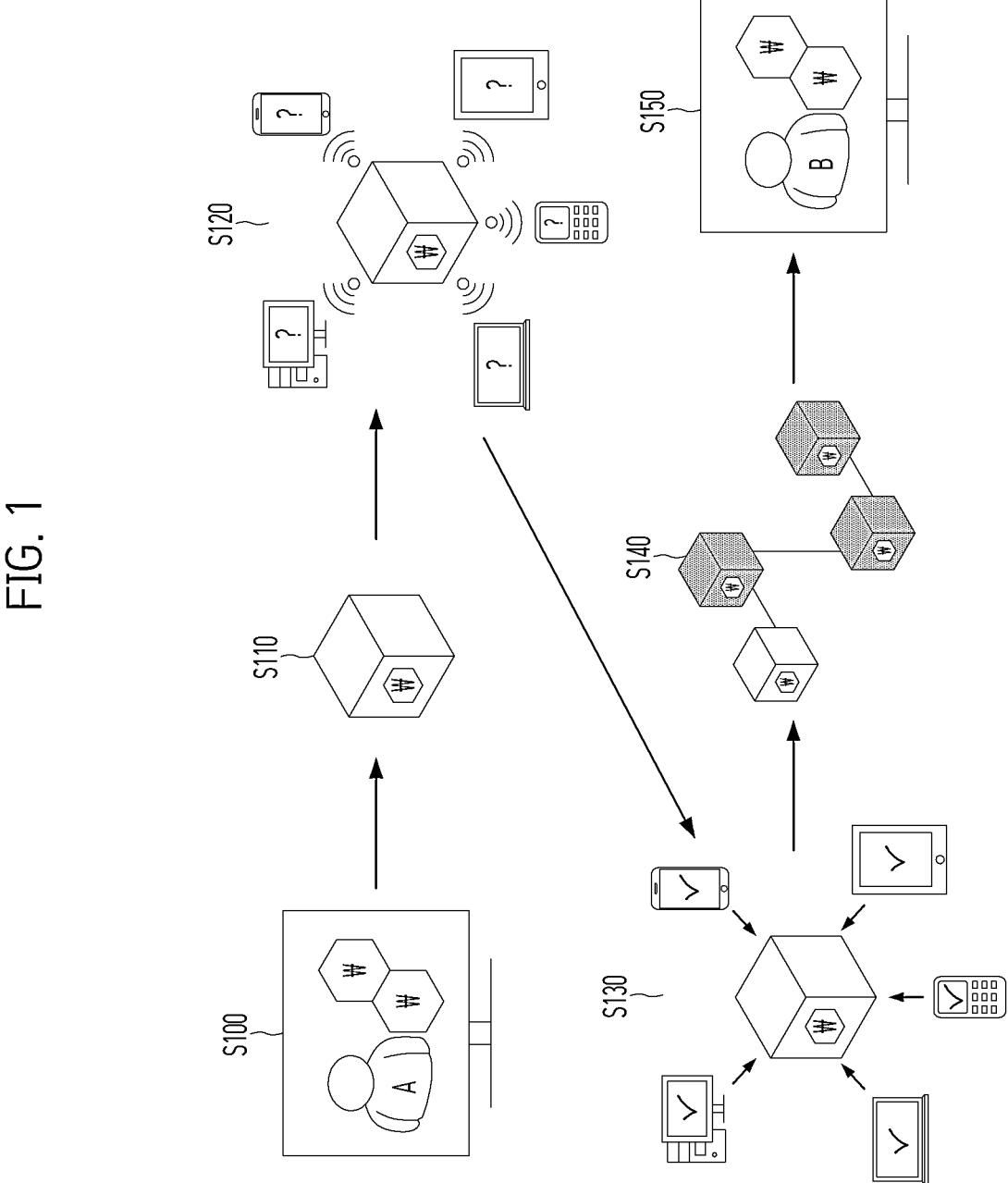
FIG. 1 is a diagram showing a blockchain network according to an embodiment of the present disclosure.

Hereinafter, the embodiments disclosed herein will be described in detail with reference to the accompanying drawings, where components that are the same as or similar to each other regardless of reference numerals will be given the same reference numerals, and redundant description thereof will be omitted.

Furthermore, the attached drawings are only intended to facilitate understanding of the embodiments disclosed in the present disclosure, and the technical ideas disclosed in the present disclosure are not limited by the attached drawings. It should be understood that the scope of the present disclosure includes all modifications, equivalents and substitutes included in the scope of the idea and technology of the present disclosure.

It will be understood that, although the terms "first," "second," "third," and so on can be used herein to describe various components, these components should not be limited by these terms. These terms are used to distinguish one component from another component. Thus, a first component as described below could be termed a second component, without departing from the scope of the present disclosure.

It will be understood that when an element is referred to as being "connected to" another element, the former can be directly connected to the latter or an intervening element can be present therebetween. In contrast, when an element is referred to as being "directly connected to" another element, there is no intervening element therebetween.

As used herein, the singular constitutes "a" and "an" are intended to include the plural constitutes as well, unless the context clearly indicates otherwise.

It will be further understood that the terms "comprise," "including," "include," and "including" when used in this specification, specify the presence of the stated features, integers, operations, elements, and/or components, but do not preclude the presence or addition of one or more other features, integers, operations, elements, components, and/or portions thereof.

Additionally, embodiments within the scope of the present disclosure include computer-readable media having or transmitting computer-executable instructions or data structures stored on the computer-readable media. Such computer-readable media can be any available media that can be accessed by a general-purpose or special-purpose computer system. By way of example, such computer-readable media can include RAM, ROM, EPROM, CD-ROM or other optical disc storage, magnetic disk storage or other magnetic storage, or physical storage media such as any other media that can be used to store therein or transmit predetermined program code means in a form of computer-executable instructions, computer-readable instructions or data structures, and that can be accessed by a general purpose or special purpose computer system. However, the present disclosure is not limited thereto.

Additionally, the device and the method according to the present disclosure can be implemented in a network computing environment with various types of computer system configurations including personal computers, laptop computers, handheld devices, multiprocessor systems, microprocessor-based or programmable consumer electronics, network PCs, minicomputers, mainframe computers, mobile phones, PDAs, pagers, etc. Further, the device and the method according to the present disclosure can be implemented in a distributed system environment where both local and remote computer systems linked to each other over a network, or via wired data links, wireless data links, or a combination of wired and wireless data links perform tasks. In the distributed system environment, program modules can be located in local and remote memory storage devices.

It will be understood that each block of the flowcharts and/or block diagrams, and combinations of blocks in the flowcharts and/or block diagrams, can be implemented by computer program instructions. These computer program instructions can be provided to a processor of a general-purpose computer, special purpose computer, or another programmable data processing apparatus, such that the instructions, which are executed via the processor of the computer or another programmable data processing apparatus, create a means for implementing the functions specified in a flowchart block(s). These computer program instructions can also be stored in a computer-accessible or computer-readable memory that can direct a computer or other programmable data processing apparatus to function in a particular manner, such that the instructions stored in the computer-accessible or computer-readable memory can also produce articles of manufacture embedding instruction means which implement the functions specified in the flowchart block(s). The computer program instructions can also be loaded onto a computer or another programmable data processing apparatus to cause a series of operations to be performed on the computer or another programmable data processing apparatus to produce a computer-implemented process, such that the instructions, which are executed on the computer or another programmable data processing apparatus, can also provide operations for implementing the functions specified in the flowchart block(s).

Further, each block described herein can indicate a portion of a module, segment, or code including one or more executable instructions to execute a specific logical function (s). Moreover, it should be noted that the functions of the blocks can be performed in a different order in several modifications. For example, two successive blocks can be performed substantially at the same time, or they can be performed in reverse order according to their functions.

In describing embodiments of the present disclosure in detail, the descriptions will mainly focus on an example of a specific system. However, the main idea claimed in the present disclosure can be applicable to other communication systems and services with similar technical background to the extent that they do not significantly deviate from the scope disclosed in the present disclosure. This application can be made based on the determination of the skilled person to the art.

The following embodiments can be partially or entirely bonded to or combined with each other and can be linked and operated in technically various ways. The embodiments can be carried out independently of or in association with each other.

Hereinafter, an electronic device using the blockchain and a control method thereof according to embodiments of the present disclosure will be described in detail.

In the present disclosure, the device is assumed to refer to an electronic device.

FIG. 1 is a diagram showing a blockchain network according to one embodiment.

The blockchain is a technology based on cryptography and a distributed system. The blockchain is a scheme in which each transaction party cannot deny transaction details even when a specific third party does not guarantee the transaction in an open network environment. The blockchain can refer to technology for operating and managing a network and database that can transmit transaction details or ledger data. Hereinafter, for convenience of descriptions, the thing including the network and the database as described above is referred to as a blockchain network. In this regard, the transaction details can refer to transaction records transmitted and received between participants in the blockchain network and stored in the database. The transaction details can be referred to as transaction, transaction information, transaction record, or transaction data, depending on the embodiments. However, the present disclosure is not limited to the above examples. Specifically, the blockchain network is similar to a distributed database, but is different therefrom in that in the blockchain network, members (e.g., nodes) participating in the network of a structure that connects transaction details or ledger data to each other and stores the same therein conduct mutual verification of the consistency of the ledger data, and store the verified ledger data in the nodes thereof. In other words, the blockchain refers to a storage platform designed to make arbitrary manipulation of the data difficult.

An operating principle of the blockchain network is as follows. One block can be created based on data (for example, transaction details or ledger data) created over a certain period of time. Newly created blocks are sequentially connected to previously created blocks in a chain structure while the newly created blocks have causality with the previously created blocks. The blocks sequentially connected to each other are connected to each other in a chain form, and the nodes thereof are synchronized with other nodes that make up the blockchain network based on a preset consensus algorithm. When 51% or greater of all nodes determine that the block is invalid, the block is determined to be illegally used or forged/altered data. Accordingly, when the invalid block is detected, the block can be removed from the blockchain network. In this way, the consistency of the block of the blockchain can be maintained. For example, referring to FIG. 1, entity A can request a transaction toward entity B in S100, and information about the transaction can be stored in a block in S110. The block is sent to each of the nodes that constitute the blockchain network in S120. Each node can verify whether the block is valid in S130. The block determined to be valid is connected to an existing blockchain in S140, and the corresponding transaction is completed in S150. However, the block determined to be invalid is removed from the blockchain network.

A service provided based on the blockchain network can include cryptocurrency also referred to as a digital asset, NFT (Non Tangible Token), DApp (Decentralized Application) as a decentralized application service, DeFi (Decentralized Finance) as a decentralized financial service, etc. More specifically, in an existing application service, information is stored in database of a central server and the application is operated on the central server. However, in the DApp free of the central server, multiple nodes that constitute the blockchain network can have the authority usually held by the central server in a divided manner. According to the DApp, unlike the existing scheme in which the data are stored in a centralized database, important data can be stored in a decentralized blockchain to improve data security and transparency. The DeFi refers to a financial service using the blockchain technology, and can mean a financial service which anyone can freely use in a decentralized environment without a central authority.

Figure 2:
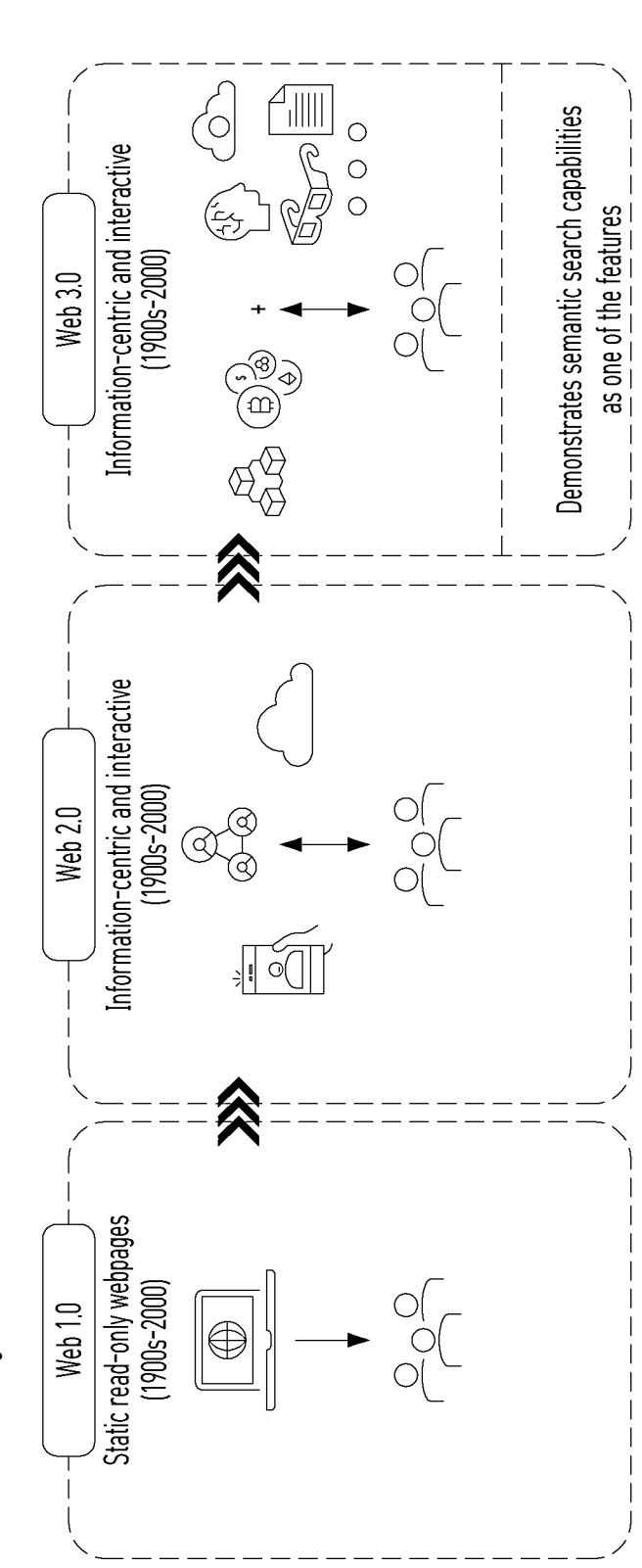
FIG. 2 is a diagram for illustrating the Web 3.0 service according to an embodiment of the present disclosure.

FIG. 2 is a diagram for illustrating the Web 3.0 service.

As blockchain technology develops, the importance of the blockchain as a key technology for providing the web 3.0 services is emerging. Referring to FIG. 2, while the previous web service is a centralized service that mainly Internet or IT content providers unilaterally provide contents or services to customers. However, Web 3.0 refers to a web environment in which customized services are provided to individual users using Symantec web technology, and contents provided through Web 3.0 are stored in a distributed manner. More specifically, in Web 1.0, web services were used in a one-way fashion in which the majority of users only read information provided from a minority. Since then, in Web 2.0, web services have been used in an interactive manner by the users producing and sharing the contents using a platform operated by a company. However, the contents are stored in a central server of the company operating the platform, and the platform is operated in a centralized manner. In contrast, in Web 3.0, personalized information can be provided using AI (Artificial Intelligence) and big data, and the contents produced and shared by the users are not stored in the central server, but are stored in the blockchain in the distributed manner. Therefore, the platform can be operated in a decentralized manner.

In the Web 3.0 services, implementation and operation of a decentralized Internet service in which the users (or customers) can own the contents and the data, and the service can provide a reward to the users when the users participate in and contribute to the Web 3.0 services by providing the contents and the data they own to other users are important. The reason why the importance of the blockchain technology as a related technology of the Web 3.0 is emerging is because the core features of the Web 3.0 can be implemented relatively easily by utilizing the blockchain technology. For example, utilizing the blockchain technology facilitates the aforementioned decentralization of the platform operation. More specifically, unlike the Web 2.0 which has no choice but to follow the service operation policy set by the company operating the platform, the Web 3.0 uses the blockchain smart contract technology to allow the users to directly participate in the platform operation. Furthermore, storing the data (or contents) in the blockchain network in the distributed manner can disallow only a specific subject to own and control the data. Additionally, profits from the operation of the platform can be distributed to the users by providing a reward corresponding to the user's contribution or participation, based on the blockchain smart contract. Accordingly, in order to implement the Web 3.0 services, it is necessary to provide a cryptocurrency wallet that enables cryptocurrency deposits, withdrawals, and transfers in the blockchain network along with the construction of the blockchain network.

As mentioned above, for the Web 3.0 services, it is necessary to decentralize the platform operation and provide fair and transparent reward for the users' contributions. To this end, the Web 3.0 service can be provided through the blockchain network. In order to construct the blockchain network, a node which can store therein transaction details or ledger data, such as accurate records of service use, records of user contributions and corresponding rewards, and verify and authenticate the validity of the transaction details or ledger data should be secured.

Figure 3:
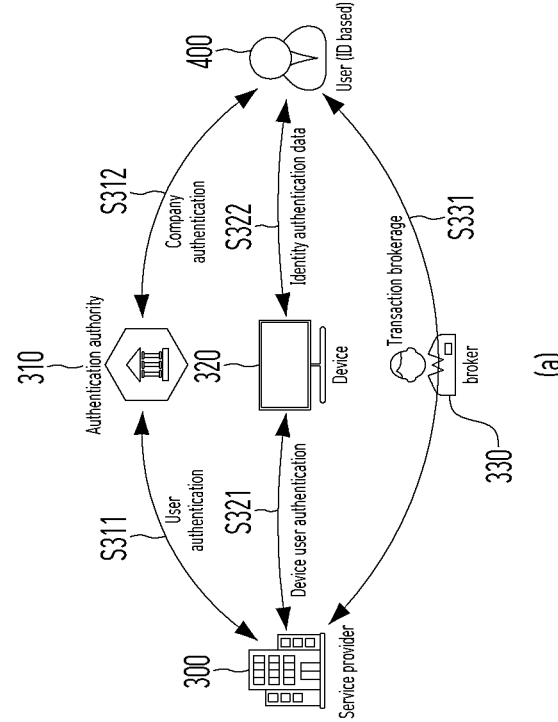
FIG. 3 is a flowchart showing a flow of a smart contract as an embodiment of the present disclosure.

FIG. 3 is a diagram for illustrating a service using a DA (device account) according to an embodiment of the present disclosure.

First, part (a) in FIG. 3 is a diagram showing a service transaction using a typical device.

Since a subject of a transaction is generally not a device 320 but a user 400, the transaction is made between a service provider 300 and the user 400. In this regard, the user 400 proceeds with the transaction using the device 320, and ID-based authentication is required for device control and user authentication.

Therefore, a separate authentication authority 310 for the user authentication is required. The service provider (company) can send an authentication request to prove an identity of the user to the authentication authority, and can receive the authentication proving that the identity of the user is true in S311. Furthermore, the user can prove the identity thereof via the authentication authority. The service provider can identify the provided authentication in S312.

When the service provider has proved that the identity of the user is true through the authentication authority, authentication to control the device is required. The user inputs his or her authentication data into the device in S322, and the service provider receives the device user authentication data through the device in S321.

When the transaction has been made, a broker 330 intervenes to handle the transaction in S331. This can increase a cost.

Furthermore, when one user uses multiple devices, user authentication is required again every time the device is changed. When one user uses the multiple devices, separate control on each device is required, thereby causing inconvenience.

For example, a case where a user typically purchases contents from a company can be assumed. The user and the company should have proved identities thereof through the authentication authority. The company can set up a process of connecting with the authentication authority to authenticate the user. The user can perform an authentication process using, for example, a cell phone number or a social security number as used in signing up.

After the signing up, the user can transmit data that authenticates his or her identity via ID-based login, etc., and the company can identify that the device is being used by an authenticated person. Thereafter, when the user makes a purchase, the broker such as a credit card company handles an asset transaction on the user's behalf.

Part (b) in FIG. 3 is a diagram showing a process of a smart contract using a device account (DA) according to an embodiment of the present disclosure.

The smart contract is a system that pre-programs the contents pre-agreed by the contract parties and puts the programming result into an electronic contract, and automatically executes the contents of the contract when all pre-agreed contract conditions are met. The contract refers to an electronic contract that does not require the intervention of a third authority and allows establishment of the contract between individuals (or between nodes). The smart contract is an electronic contract in a form of a script in which a contract written on the paper is implemented using codes (e.g., solidity) and the contract is automatically executed when a predefined condition is met. Accordingly, using the smart contract, even when the contract parties do not know each other or do not trust each other, they can safely conduct the contract under the blockchain network. Further, the contract can be automatically executed when the predefined condition is met without an intermediary. For example, a smart contract condition can be as follows: when a customer watches a movie or a drama provided through a Web 3.0-based media service and posts a rating or a review thereon, this can be determined as the customer's contribution to the media service within the blockchain network, and thus, a token can be issued to the customer as the reward for the contribution.

A device account (DA) is a type of a new blockchain account proposed in the present disclosure and can take a form of a software wallet (e.g., digital wallet) within the blockchain that is logically connected to the device. In other words, the DA allows the device to operate as the subject of the smart contract (e.g., rather than the person or the user), such that operations that are difficult to implement with existing blockchain accounts can be realized.

In the current blockchain, an account is a basic unit of all transactions. The account formats EoA (Externally Owned Accounts) and CA (Contract Accounts) are already solidly designed as Ethereum blockchain accounts.

However, when trying to use the device as the subject of the transaction, it is difficult to properly apply the characteristics of the device to the account when using only the current EoA and CA accounts.

The DA allows the device to act as the transaction subject, and thus allows the device to create and sign the transaction on its own. In other words, the DA allows the device to act with agency. The DA can authenticate the device to enable the transaction on the blockchain network. Furthermore, the DA can read a state of the device in order to fulfill the contract, and receive a control command and ultimately control the device based on the control command. Furthermore, on the blockchain, the device account itself can act as the subject of the transaction and can transmit or receive the asset (e.g., cryptocurrency or tokens).

The DA can prove that an identity of the device is true by itself. For example, the DA can prove that an identity of the device is true via Type, ERC (Enterprise Registration Certificate), Device certificate, etc. Furthermore, the DA can be designed to enable one-to-one conversion of the existing ID system (PuF, MAC, etc.) of the device to the address system on the blockchain. This is to enable the address on the blockchain to be inferred based on information about an off-chain device.

In accordance with one embodiment of the present disclosure, when a blockchain-based smart contract is used and the device itself acts as the subject of the transaction, a separate authentication process or broker can be omitted or avoided. In other words, as shown in the drawing, the subject of the transaction is the device itself, such that the transaction can be made using the smart contract without a separate broker.

According to one embodiment of the present disclosure, a smart contract 200 is made directly between the service provider 300 and a device 1.

First, the service provider can create a smart contract and deploy the created smart contract on the blockchain in S341. Afterwards, the device can create a transaction that the device agrees with the smart contract and transmit the created transaction on the blockchain in S342, thereby establishing a transaction based on the smart contract.

According to the rules defined in the smart contract, when the device makes payment in S344, the service provider 300 receives a corresponding revenue in S343. Furthermore, the service provider 300 can set a deposit according to the smart contract 200 in S345. When the device provides device information according to the smart contract, the device can receive a corresponding reward from the service provider 300 in S346. Furthermore, according to the smart contract, the device can receive the service for the price paid in S347.

In this regard, since the device has a unique and trusted device account (DA), there is no need for separate authentication on the device.

The company is directly the subject of the transaction. The transaction can be made transparently on the blockchain. Thus, there is no need for separate authentication, so that the intervention of the separate authentication authority can be omitted. Furthermore, since the transaction on the smart contract is trustworthy, the service transaction can be made based on the smart contract without a broker. Furthermore, since each device has an account, a separate transaction can be made on each device without the separate authentication or login processes by the user.

The smart contract using the device account (DA) will be described in more detail with referring to a following flowchart.

Figure 4:
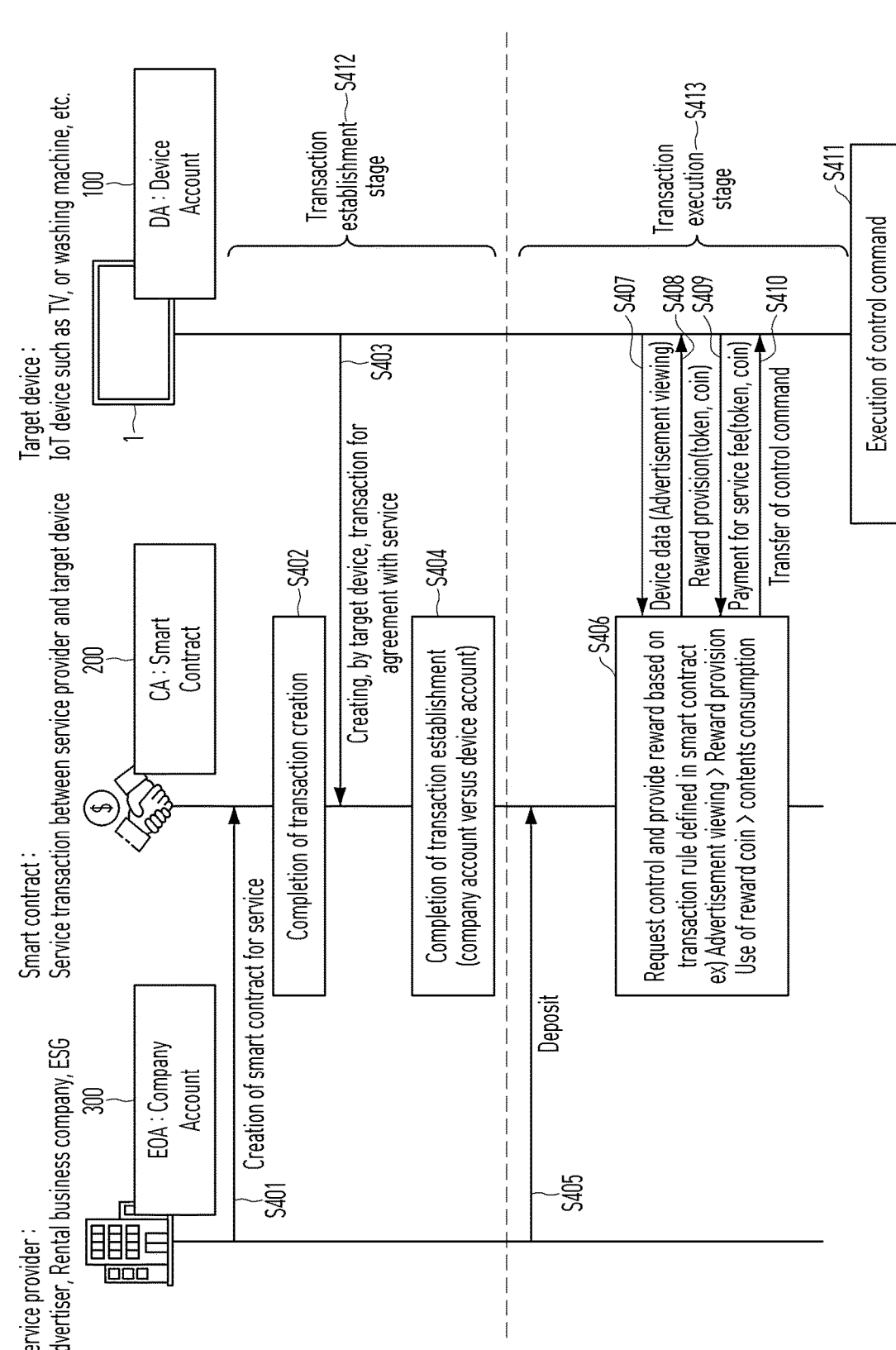
FIG. 4 is a conceptual diagram of IoT blockchain according to an embodiment of the present disclosure.

FIG. 4 is a flowchart showing a flow of a smart contract as one embodiment of the present disclosure.

The smart contract on the blockchain can be made directly between a service provider and a target device.

First, the service provider can create a smart contract for a service using the EOA account, and deploy the created smart contract on the blockchain in S401. In this regard, the service provider can be advertisers, rental business companies, ESG, content providers, etc.

When the smart contract 200 has been created on the blockchain in S402, the target device that wants to use the service can create a transaction of agreement with the smart contract by itself in S403. When the device transmits the created transaction to the blockchain, a transaction based on the smart contract between a service provider account and the device account has been established in S404.

A stage up to this point can be a transaction establishment stage in S412. Next, a transaction execution stage in S413 is described. The transaction is executed according to the transaction rules defined in the smart contract in S406.

The service provider can pre-input a deposit for execution of the transaction on the smart contract in S405.

The target device 1 can transmit device data to the blockchain through the DA. In this regard, the device data can be about an action of the electronic device as defined in the smart contract, such as a record of watching an advertisement in S407.

According to the rules defined in the smart contract, when the service provider receives the data, the service provider can provide a reward corresponding to the data to the device account in S408. In this case, the reward can be provided directly to the device account, such that a separate broker is not required.

According to another embodiment of the present disclosure, the device can directly pay for the service fee using tokens or coins in S409. In this regard, the device account (DA) can serve as a wallet by itself.

When the device has paid for the fee for the service, the transaction is executed so that a corresponding service can be provided to the device according to the rules defined in the smart contract. That is, a control command is transmitted to the device account (DA) through the smart contract in S410, and the device account (DA) can control the device to execute the control command in S411.

In this regard, the device account (DA) can access the device information and directly control the device.

Figure 5:
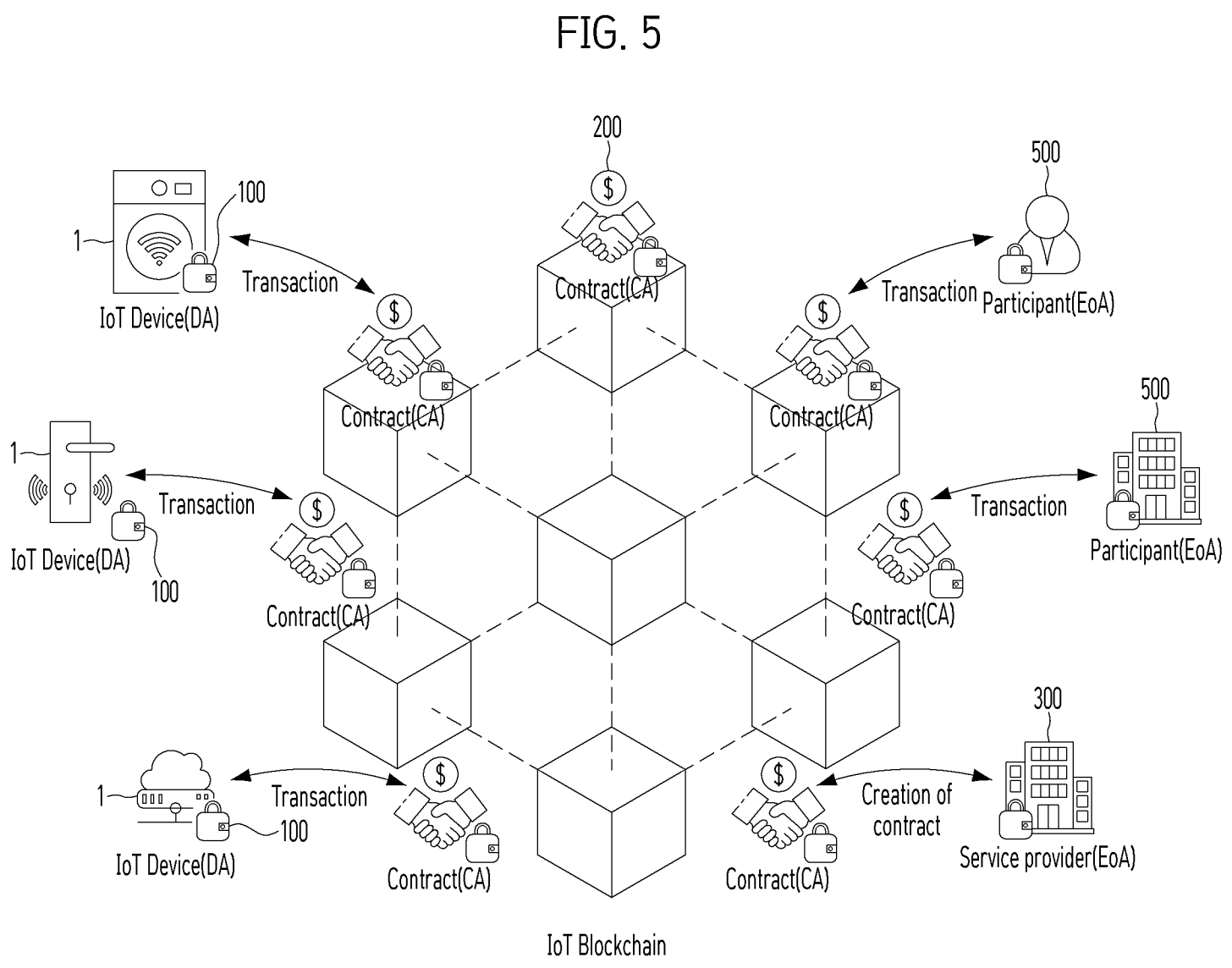

FIG. 5 is a conceptual diagram of IoT blockchain to which an embodiment of the present disclosure is applied.

As shown, the smart contract 200 can exist on the blockchain, and each device 1 can directly perform the transaction on the blockchain with its own device account (DA) 100. An individual 500 having an existing EoA account can make the smart contract on the blockchain.

At this time, the service provider 300 can create the service on the blockchain.

Figure 6:
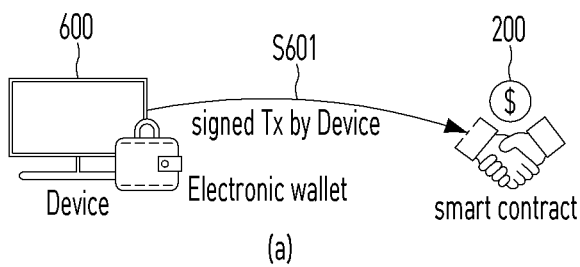
FIG. 6 is a diagram for illustrating a method in which the DA creates a transaction according to an embodiment of the present disclosure.
Figure 6:
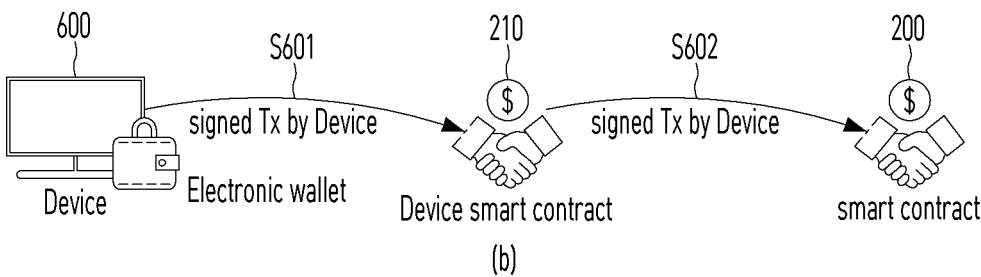
Figure 6:
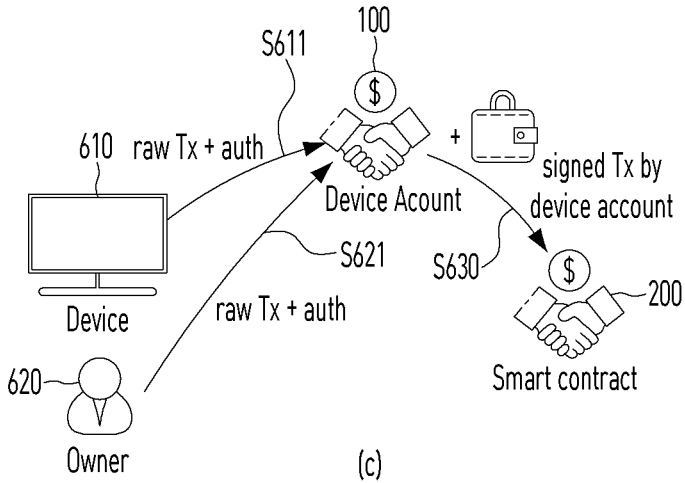

FIG. 6 is a diagram for illustrating a method in which the DA creates a transaction.

Parts (a) and (b) in FIG. 6 show an example method for using the smart contract using a device.

Often, the smart contract can be executed using the device. However, since there is no device account (DA), the device should manage a private key with a separate EoA. Therefore, it is difficult for the device to create the transaction on its own.

Therefore, it is difficult to support an electronic wallet for the device, and the transaction can only be created using an existing implemented logic. Therefore, it is difficult to create and manage the electronic wallet. Furthermore, when the device is not operating, the EoA account of the device is not available.

Referring to part (a) in FIG. 6, a device 600 creates the electronic wallet with a separate EoA, and creates the transaction with the existing implemented logic, and signs the transaction through the device to execute the smart contract in S601.

The device transmits the signed transaction to the smart contract.

Furthermore, referring to part (b) in FIG. 6, the device 600 can only create a smart contract 210 for the device in S601, and therefore, the transaction can be created only with the existing implemented logic in S602.

Part (c) in FIG. 6 is a diagram showing a transaction creation method when the device account concept is introduced according to an embodiment of the present disclosure.

The device account takes the form of the software wallet within the blockchain that is logically coupled to the device. The device or an owner thereof transmits a raw transaction, and the device account can sign and execute the raw transaction. Therefore, since the device can freely create arbitrary transactions on its own, free transactions are possible and the inconvenience of having to follow only the existing logic can be resolved.

Furthermore, the device account can freely create and transmit the transaction via separate authentication.

An electronic device 610 as one embodiment of the present disclosure can create a raw transaction on its own.

Figure 7:
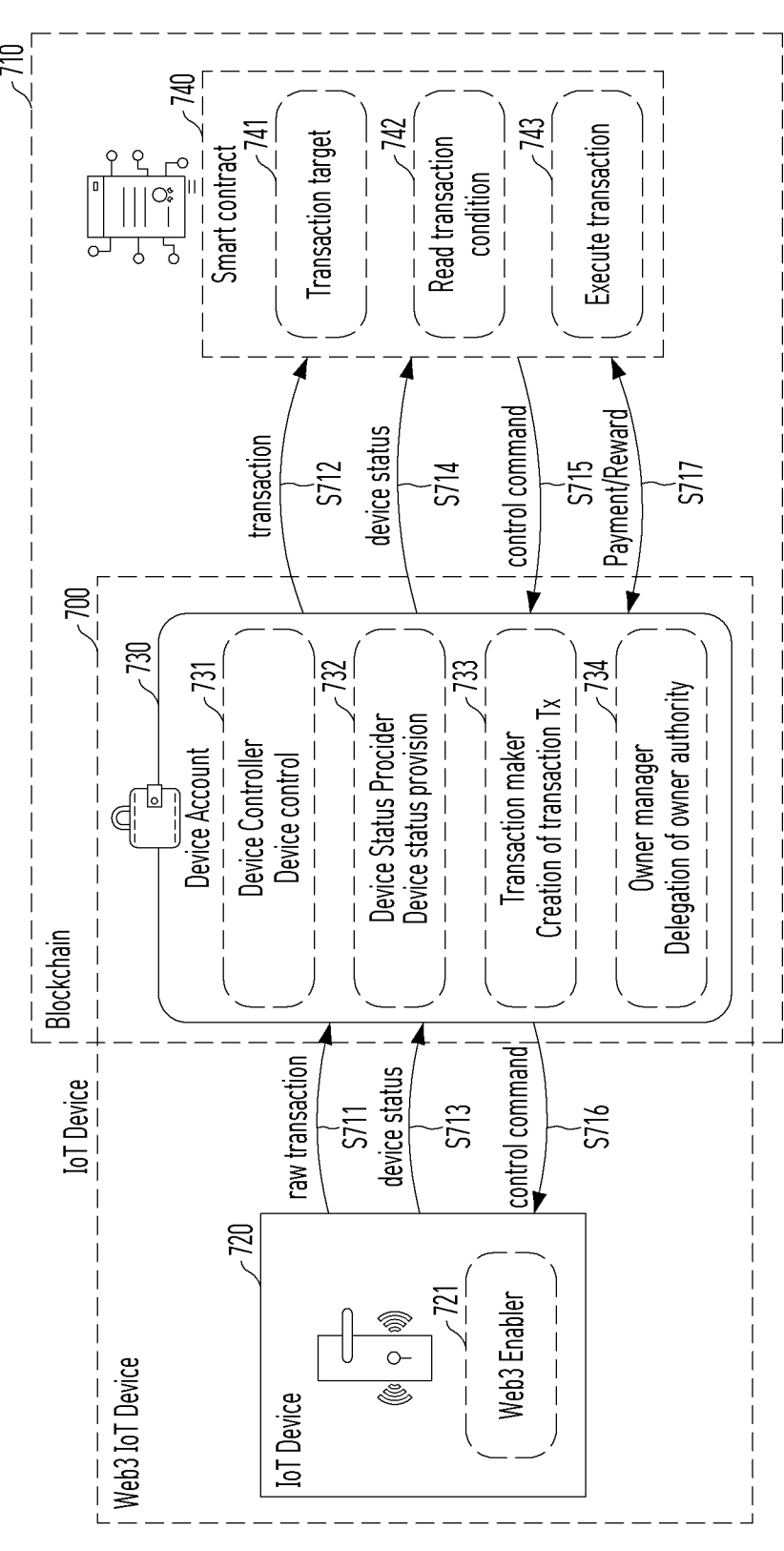
FIG. 7 is a diagram for illustrating a structure of the DA according to an embodiment of the present disclosure.

FIG. 7 is a diagram for illustrating a structure of the DA according to an embodiment of the present disclosure.

An electronic device as an embodiment of the present disclosure can be an IoT device 700 that supports the Web 3.0. That is, the IoT device 720 can include a Web 3.0 enabler. Furthermore, the IoT device 720 can include a memory storing therein the device account 730.

The device 720 can create the raw transaction on its own in S711. The device 720 can transmit the created raw transaction to the DA 730. The device account can sign the transaction, and can transmit the signed transaction 733 to a blockchain network 710 in S712.

Furthermore, the device account can receive a device status, and device information 732 from the device in S713, and can transmit the status and the information to a smart contract 740 to execute the smart contract 740 on the blockchain in S714.

The smart contract 740 has been created and exists on the blockchain network, contains information about a transaction target 741, reads a transaction condition 742, and automatically executes the transaction in 743 when the condition is met.

When the condition set in the smart contract is met, the smart contract 740 can transmit a corresponding control command to the DA on the blockchain in S715. The DA can transmit the control command to the device in S716 to consequently control the device in 731.

Furthermore, the DA itself acts as a digital wallet and can be the subject of the transaction, and thus can directly pay for the asset or can receive the reward in S717.

The DA can create the transaction on its own, and can delegate the authority to the owner of the device such that the transaction is executed according to a command input from the owner in 734.

Figure 8:
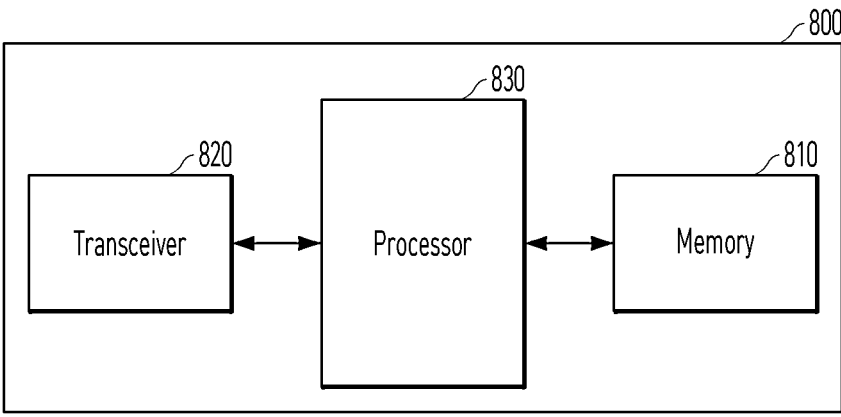
FIG. 8 is a block diagram for illustrating a configuration of an electronic device as one embodiment of the present disclosure.

FIG. 8 is a block diagram for illustrating a configuration of an electronic device as one embodiment of the present disclosure.

The device 800 can include a memory 810, a transceiver 820, and a processor 830.

The memory 810 can store therein the device account (DA). In this regard, the DA can mean data that uniquely identifies the electronic device.

The transceiver 820 can transmit and receive data. The transceiver 820 can transmit the data to the blockchain network, and can receive the data from the blockchain network and can deliver the received data to the memory.

The processor 830 can be connected to the memory 810 and the transceiver 820 and can control the memory and the transceiver. Via the processor, the DA can receive the device information and transmit the control command to the device.

Figure 9:
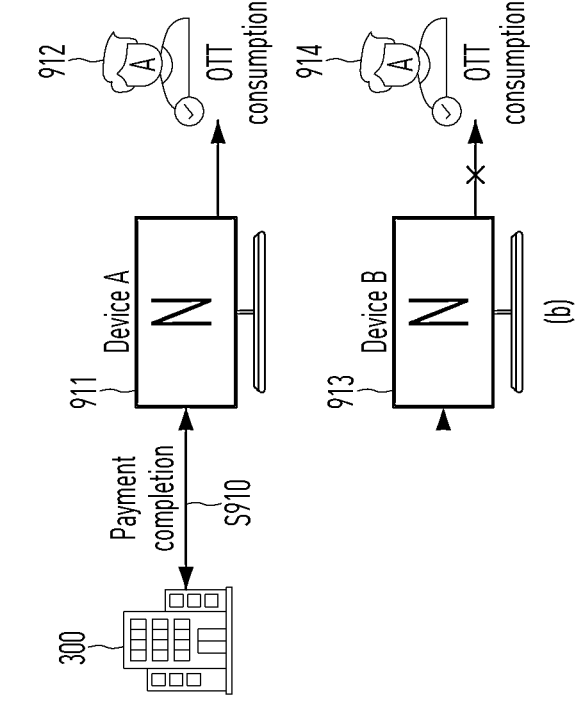
FIGS. 9 to 11 are diagrams showing an example of a service using the DA as one embodiment of the present disclosure.
Figure 10:
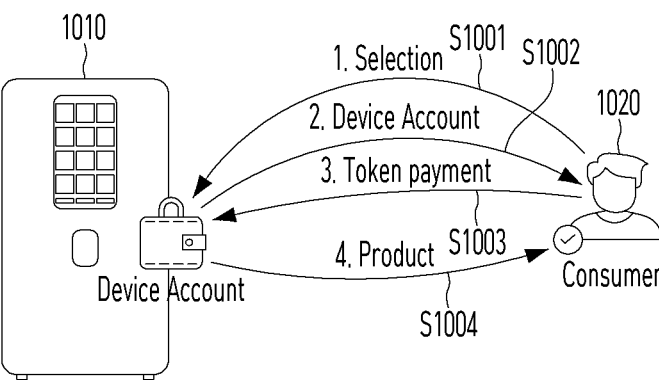
Figure 11:
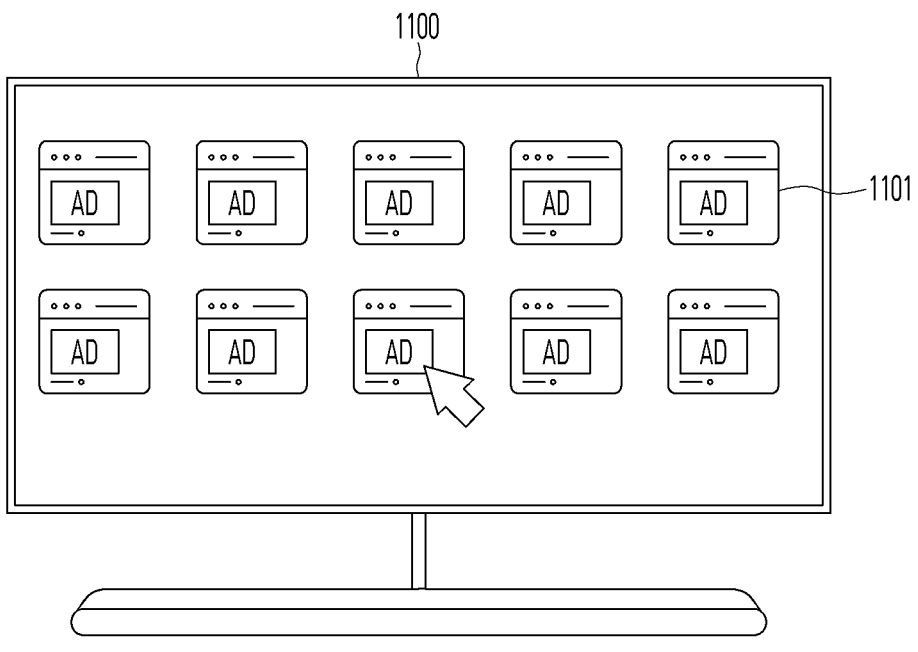

FIGS. 9 to 11 are diagrams showing an example of a service using the DA as one embodiment of the present disclosure.

FIG. 9 shows an example of a method of providing an OTT service according to one embodiment of the present disclosure.

Part (a) in FIG. 9 shows an example of a typical service method. The user can log into the service using an account based on an ID and can use the OTT service. In this regard, in the user-based OTT viewing right transaction, it is difficult to identify an OTT consumption by each device, and there is the inconvenience for the user to have to log in the service and authenticate the identity of the user each time when the device is changed. For example, when a user 900 wants to use a service on a device A 902, he or she can log into the service, authenticate his or her identity in S901, and use the content on the device in 903. Also, when the same user wants to use the same service on another device B 904, he or she should go through the login process again through the device in S901 and authenticate his or her identity and can use the service on the device B in 905. Furthermore, in a more typical situation, the user can share the account with other users.

Part (b) in FIG. 9 shows a service provision method using the device account (DA) according to an embodiment of the present disclosure.

Service provision is made between the service provider 300 and a device 911, and the device 911 can pay for the service via its own account in S910. In this case, the payment can be made using a registered user wallet regardless of the content platform. In other words, the reliably of the payment can be increased with single payment means. Furthermore, in this case, a consumer 912 can receive the content on the device which has executed the payment without the need for separate login or authentication. In one example, the service is provided based on the account connected with the device in a one-to-one manner. Thus, the same user cannot receive the contents on another device. This has the advantage of preventing the ID sharing from the service provider's perspective. Furthermore, from the user's perspective, the transaction can be made on each device basis, thereby lowering the cost of the contents use. The service provider can segment prices based on a device size. For example, a higher price can be set to a large TV as a shared device, and a lower price can be set to a smart phone, as a personalized device. In another example, the resolution can vary on each device basis, and a detailed price can be set based on each resolution.

FIG. 10 illustrates a service using a vending machine as an example of device account-based service provision according to an embodiment of the present disclosure.

When using a vending machine, a transaction system for product transactions is often used, and a transaction agency such as a credit card company is required. However, when using a smart contract using the blockchain, direct transactions between the service provider and the consumer can be made without the intervention of an agent or broker. In other words, the transactions can be made directly in a P2P-based trustworthy manner.

A vending machine 1010 can directly transact with a consumer 1020 using the device account DA on the blockchain logically connected to the machine 1010. The service provider can provide the service by pre-creating the smart contract related to the product.

First, when the consumer 1020 selects the product in S1001, the vending machine device 1010 can inform the consumer of its device account information in S1002. Since the device account is able to perform direct asset transaction, the consumer can pay a set amount of tokens to the device account in S1003. When the consumer pays the amount of tokens defined in the smart contract, the machine 1010 can execute the smart contract to provide the corresponding product to the consumer in S1004.

When the smart contract is established in this way, direct and trustworthy transactions can be made automatically without going through an intermediate broker.

FIG. 11 is an example of an advertisement-related rewarding system as an example of device account service provision according to an embodiment of the present disclosure.

A typical advertising system typically performs advertising transactions based on a content platform. In this case, it is difficult to measure the effectiveness of the advertising, and there is the inconvenience of requiring a separate platform to provide the reward.

An advertisement-related rewarding system using a device account according to an embodiment of the present disclosure can provide a direct transaction between an advertisement provider and an advertisement consumer. When the consumer accesses an advertisement 1101 using a device 1100, he or she can receive a reward for advertisement consumption through the device account (DA) without having to go through the platform. In this case, the advertisement provider can accurately measure the consumption of the advertisement. Furthermore, the advertisement provider can provide an advertising marketplace. Furthermore, the consumer can receive the reward in the form of digital coins or cryptocurrency when consuming the advertisement, and can purchase the contents using the coins received as the reward.

It is obvious to those skilled in the art that the present disclosure can be embodied in other specific forms without departing from the essential features of the present disclosure.

The above detailed description should not be construed as restrictive in any respect and should be construed as illustrative. The scope of the present disclosure should be determined based on reasonable interpretation of the attached claims, and all changes within the equivalent scope of the present disclosure are included in the scope of the present disclosure.

What is claimed is:

1. A method for controlling an electronic device using blockchain, the method comprising:
   generating and transmitting, by a processor in the electronic device, a first transaction to a device account (DA) stored in a memory;
   transmitting, by the DA, a second transaction to a smart contract;
   transmitting, by the DA, device data for controlling an operation of the electronic device to the smart contract;
   receiving, by the DA, data corresponding to a first value according to a transaction rule defined in the smart contract;
   transmitting, by the DA, the first value to the processor; and
   executing, by the processor, a control command corresponding to the first value,
   wherein the DA is a software wallet within the blockchain that is logically coupled with the and includes data uniquely identifying the electronic device, and
   wherein the second transaction is obtained based on encoding a signature of the DA into the first transaction.

2. The method of claim 1, further comprising:
   transmitting, by the smart contract, data corresponding to a second value corresponding to the device data to the DA; and transmitting, by the DA, data corresponding to a third value to the blockchain.

3. The method of claim 2, wherein the data corresponding to the first value includes a control command related to at least one of control of the electronic device, playing contents by the electronic device, or obtaining a reward by the electronic device, and wherein each of the data corresponding to the second value and the data corresponding to the third value includes at least one of cryptocurrency, a token or a digital coin.

4. The method of claim 1, wherein the data corresponding to the first value defined in the smart contract varies based on one or more of a type, a screen size, or a resolution of the corresponding to the DA.

5. The method of claim 4, wherein the type of the corresponding to the DA includes a shared device or a personalized device.

6. The method of claim 1, further comprising receiving a private key of a first user, wherein the first transaction is created based on the private key of the first user.

7. The method of claim 1, wherein the first transaction is created by the itself without user confirmation.

8. The method of claim 7, wherein the first transaction is one of a pre-defined set of available transactions.

9. An electronic device using blockchain, the electronic device comprising:

a memory configured to store a device account (DA);

a transceiver configured to transmit and receive data; and a processor configured to:

transmit a first transaction to the DA stored in the memory, transmit a second transaction to the blockchain for establishing a smart contract, the second transaction being based on the DA stored in the memory, transmit device data to the blockchain, the device data being related to an action of the electronic device, and receive data corresponding to a first value according to a transaction rule defined in the smart contract, wherein the DA is a software wallet within the blockchain that is logically coupled with the and includes data uniquely identifying the electronic device.

10. The electronic device of claim 9, wherein the further comprises a display configured to display an image, and wherein the processor is further configured to:

transmit data corresponding to a second value to the blockchain and play contents, via the display, the contents corresponding to the second value according to the transaction rule defined in the smart contract.

11. The electronic device of claim 9, wherein the first transaction is a raw transaction, and the second transaction a transaction based on the raw transaction, wherein the first transaction is created by the electronic device itself without user confirmation, and wherein the first transaction is one of a pre-defined set of available transactions.

12. The electronic device of claim 10, wherein each of the data corresponding to the first value and the data corresponding to the second value includes at least one of cryptocurrency, a token or a digital coin.

13. The electronic device of claim 9, wherein the memory storing the DA is in the electronic device or in the blockchain which is external to the electronic device.

14. The electronic device of claim 10, wherein the data corresponding to the first value defined in the smart contract or the data corresponding to the second value defined in the smart contract varies based on one or more of a type, a screen size, or a resolution of the electronic device corresponding to the DA.

15. The electronic device of claim 14, wherein the type of the electronic device corresponding to the DA includes a shared device or a personalized device.

16. The electronic device of claim 9, wherein the processor is further configured to receive a private key of a first user, wherein the first transaction is created based on the private key of the first user, wherein the second transaction is obtained by encoding a signature of the DA into the first transaction.

17. A method for controlling an electronic device using blockchain, the method comprising:

generating and transmitting, by a processor in the electronic device, a first raw transaction to a device account (DA) stored in a memory;

transmitting, by the DA, a second transaction to a smart contract stored on the blockchain, the second transaction being based on the first raw transaction;

transmitting, by the DA, device status data for controlling an operation of the electronic device to the smart contract;

receiving, by the DA, a control command based on a transaction rule defined in the smart contract;

transmitting, by the DA, the control command to the processor; and executing, by the processor, the control command, wherein the DA is a software wallet within the blockchain that is logically coupled with the and includes data uniquely identifying the electronic device, and wherein the second transaction is obtained based on encoding a signature of the DA into the first raw transaction.

18. The method of claim 17, further comprising:

transmitting, by the DA, a payment based on the control command to the smart contract; or receiving, by the DA, a reward based on the control command from the smart contract.

19. The method of claim 17, wherein the second transaction is signed by the DA itself without explicit user signature or user confirmation.

* * * * *